United States Patent
Almeida Rivera et al.

(10) Patent No.: US 8,945,659 B2
(45) Date of Patent: Feb. 3, 2015

(54) METHOD FOR PREPARING A FIBRE CONTAINING EMULSION

(75) Inventors: Cristhian Paul Almeida Rivera, Vlaardingen (NL); Jacob Nijsse, Vlaardingen (NL); Sudarshi Tanuja A. Regismond, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 564 days.

(21) Appl. No.: 12/720,106

(22) Filed: Mar. 9, 2010

(65) Prior Publication Data

US 2010/0233342 A1 Sep. 16, 2010

(30) Foreign Application Priority Data

Mar. 11, 2009 (EP) .................................... 09154834

(51) Int. Cl.
*A23L 1/308* (2006.01)
*A23L 1/24* (2006.01)
*A23L 1/39* (2006.01)
*A23L 2/52* (2006.01)

(52) U.S. Cl.
CPC . *A23L 1/308* (2013.01); *A23L 1/24* (2013.01); *A23L 1/3081* (2013.01); *A23L 1/39* (2013.01); *A23L 2/52* (2013.01)
USPC ........... 426/616; 426/506; 426/518; 426/605; 426/615

(58) Field of Classification Search
USPC ............ 241/21, 23, 2, 24.16, 24.19; 426/518, 426/506, 605, 615, 616
See application file for complete search history.

(56) References Cited

U.S. PATENT DOCUMENTS

| | | | | |
|---|---|---|---|---|
| 2,836,368 A | * | 5/1958 | McCoy | 241/17 |
| 3,399,838 A | * | 9/1968 | Hanser | 241/8 |
| 4,865,863 A | * | 9/1989 | Prosise et al. | 426/518 |
| 5,766,662 A | * | 6/1998 | Inglett | 426/481 |
| 2004/0197463 A1 | * | 10/2004 | Gottemoller | 426/629 |
| 2004/0265451 A1 | * | 12/2004 | Rooks et al. | 426/489 |
| 2005/0089621 A1 | | 4/2005 | Aquino et al. | |
| 2006/0008498 A1 | * | 1/2006 | Chen | 424/422 |
| 2009/0004642 A1 | | 1/2009 | Magaletta et al. | |

FOREIGN PATENT DOCUMENTS

| WO | 93/17856 A1 | 9/1993 |
|---|---|---|
| WO | 2005/039316 A | 5/2005 |
| WO | 2006/004690 A | 1/2006 |
| WO | WO 2008148828 A1 * | 12/2008 |

OTHER PUBLICATIONS

Chinnan, MS; McWatters, KH; and Rao, VNM. 1985. [Online]. Rheological Characterization of Grain Legume Pastes and Effect of Hydration Time and Water Level on Apparent Viscosity. J Food Sci. 50:1167-1171. Downloaded from <URL: http://onlinelibrary.wiley.com/doi/10.1111/j.1365-2621.1985.tb13036.x/pdf>.*
Figuerola et al., Fibre concentrates from apple pomace and citrus peel as potential fibre sources for food enrichment; Food Chemistry; no month, 2005; p. 395-401.*
Definition of Citrus; Oxford English Dictionary, second edition (1989); Oxford University Press 1989; available at: http://www.oed.com/oed2/00040525; accessed on May 6, 2014; Published 1989.*
International Search Report. PCT/EP2010/052547, mailed Apr. 29, 2010, 6 pp.
R.J. Redgwell, M. Fischer: "Dietary fibre as a versatile food component: an industrial perspective". Molecular Nutrition & Food Reaearch. vol. 49, No. 6, Feb. 28, 2005, pp. 421-535, XP002526163.
S. Wennerstrum, et al.: "Size reduction solutions for hard-to reduce materials", Powder and Bulk Engineering, [Online] Jan. 1, 2002, pp. 1-5, XP002576231.
European Search Report, EP 09 15 4834, dated Apr. 30, 2009, 3 pp.
R. J. Redgewell, M. Fischer: "Dietary fibre as a versatile food componenet: an industrial perspective", Molecular Nutrition & Food Research, vol. 49, No. 6, Feb. 28, 2005, pp. 421-535, XP002526163.

* cited by examiner

*Primary Examiner* — Humera Sheikh
*Assistant Examiner* — Walter Moore
(74) *Attorney, Agent, or Firm* — Ellen Plotkin

(57) ABSTRACT

A method for preparing a fiber-in-water slurry containing insoluble fibers includes the steps of (a1) preparing a fiber-in-water slurry containing the insoluble fibers, (a2) freezing the slurry and (a3) grinding the frozen slurry. Insoluble fibers of tomatoes, peaches, pears, apples, plums, citrus, and combinations are used.

4 Claims, No Drawings ial properties (in particular: creaminess), and improved mouth feel as compared to low-oil, insoluble fibre containing emulsions of the prior art.

METHOD FOR PREPARING A FIBRE CONTAINING EMULSION

FIELD OF THE INVENTION

The present invention is directed to a method for preparing an edible emulsion comprising fibres. More particularly, the invention is directed to a method for preparing an edible emulsion comprising insoluble fibres, wherein said method includes a homogenization step.

The edible emulsion prepared according to the method of the present invention may be used as a base for mayonnaise, dressings, soups, sauces, dips, spreads, fillings, drinks or the like, and for hot, cold and frozen applications.

BACKGROUND OF THE INVENTION

Edible emulsions are used as a base for many types of food products. Mayonnaise compositions, for example, comprise edible oil-in-water emulsions that typically have between 80 to 85% by weight oil, and egg yolk, salt, vinegar and water.

The oil present in the edible emulsions used in such food products is generally present as droplets dispersed in the water phase.

In addition to droplet size and the amount of droplets dispersed, the close packing of the oil droplets results in the characteristic rheological behaviour of the emulsions used to make the desired food product (e.g. mayonnaise).

Notwithstanding the fact that many consumers enjoy the taste of full fat products, there is an increasing demand for food, products prepared from edible emulsions that have less fat and calories than conventional full fat products.

It is known that attempts have been made to formulate reduced fat and calorie food products, like mayonnaise compositions. In particular, it has been disclosed in WO-05/039316 that edible emulsions comprising insoluble fibres can be used as a base to make a variety of food products, and result in a food product that has the characteristic of a full fat product when less than the conventional amount of oil is employed.

However, it has been observed that the creaminess of such low-oil, insoluble fibre-containing edible emulsions often leaves to be desired due to the relatively high insoluble fibre content needed for structuring purposes.

It is therefore an object of the present invention to find a process for preparing an edible emulsion, by which process a low-oil edible emulsion can be prepared which emulsion has reduced insoluble fibre content but similar texture and sensorial properties (in particular: creaminess), and improved mouth feel as compared to low-oil, insoluble fibre containing emulsions of the prior art.

It has now surprisingly been found that this object can be achieved by a method for preparing an insoluble fibre-containing edible emulsion, wherein a slurry of the insoluble fibre in water is first frozen and ground before being homogenized.

DEFINITION OF THE INVENTION

Accordingly, in a first aspect the present invention provides a method for preparing a fibre-in-water slurry containing insoluble fibres, wherein said method comprises the steps of:
(a1) Preparing fibre-in-water slurry containing the insoluble fibres;
(a2) Freezing said slurry; and
(a3) Grinding said frozen slurry.

In a second aspect the present invention provides a method for preparing an edible emulsion comprising oil, water and insoluble fibres, said method comprising the steps of
(c1) raising the temperature of the fibre-in-water slurry obtained using the method of the first aspect of the invention until said slurry is in the liquid state;
(c2) adding any further ingredients of the edible emulsion; and
(c3) homogenizing the thus-obtained mixture.

In a third aspect, the present invention is directed to an edible emulsion obtainable by the method of the invention, said emulsion comprising from about 2.0 to about 85%, preferably from about 2.0 to about 65% by weight of oil, and wherein the particle size of the fibres present in said emulsion is at least 10% lower than the particle size of the fibres in an edible emulsion of the prior art, i.e. an emulsion having the same composition but prepared by applying the steps of mixing the ingredients and homogenizing the resulting mixture at 350 bar, the particle size being measured using a known light scattering technique.

Furthermore, the viscosity and Stevens value—as measured using known techniques—of said edible emulsion obtainable by the method of the invention are preferably increased by more than 15% respectively more than 10% as compared to the viscosity and Stevens value of the above-indicated emulsion of the prior art. In addition, the syneresis of said edible emulsion obtainable by the method of the invention is desirably more than 20% lower than the syneresis of the above-indicated emulsion of the prior art.

In a fourth aspect, the present invention is directed to a reduced oil food product comprising an edible emulsion prepared according to the first aspect of this invention.

In the context of the present invention, "slurry" means a water-continuous mixture of water and insoluble fibre. Furthermore, "oil", as used herein, means triglycerides, and especially, those that are liquid at room temperature. "Water", as used herein, means pure water or a solution thereof. "Insoluble fibre" means fibre suitable for human consumption and not water soluble whereby when the same is supplied as an additive composition, the additive composition is not more than 50% by weight soluble fibre, based on the total weight of soluble and insoluble fibre in the additive composition.

Edible emulsion with conventional amounts of oil means an emulsion, not in final food product form, comprising about 80-85% by weight oil, based on the total weight of the edible emulsion. Texture and sensorial properties associated with full fat products means that food products made with edible emulsions prepared according to the present invention unexpectedly have viscosities and mouth feels consistent with full fat products, wherein such food products of the invention have excellent mouth feel, are not sticky or tacky (as is the case with food products having starch), and breakdown and dissipate in the mouth in a time and manner similar to that of full fat products.

"Smooth", as used herein, means no discernable grainy or particle comprising characteristics when in the mouth.

"Reduced oil", as used herein, means a food product with less than 75% by weight of oil based on the total weight of food product. Food product, as used herein, means a product ready for consumption and comprising an edible emulsion prepared according to this invention.

"Syneresis" as used herein, means the extent at which water has been separated from the gel structure of the edible emulsion prepared according to the invention.

DETAILED DESCRIPTION

A homogenization step is included in the method of the invention so as to obtain an edible emulsion having a smooth texture. An additional advantage of the method of the present invention is that the homogenization step can be carried out in a homogenizer which is pressurized at a lower pressure than those applied in known methods for preparing insoluble fibre containing edible emulsions according to the prior art. The homogenization step is preferably carried out under pressures from about 35 to about 300 bars. Typically, such homogenization step is carried out at a temperature from about 15.0° C. to about 70° C. (preferably about ambient temperature).

The fibre-in-water slurry prepared in step (a1) of the method of the invention preferably contains the water in an amount which is sufficient for hydrating the insoluble fibre, said amount being suitably at least 10 wt %, preferably at least 50 wt %. Depending on the type of insoluble fibre applied, the fibre concentrations in the slurry are desirably as high as possible so as to result in a higher viscosity of the edible emulsion prepared according to the invention. As a further result, generally thicker and stronger food products at equal insoluble fibre concentrations are obtained. So depending on the type of insoluble fiber the slurry may contain 4-80% by weight of insoluble fibre. Preferably, the insoluble fiber content of the slurry is 4-60% by weight, more preferably—particularly when insoluble citrus fibre is used—this content being 4-10% by weight.

During the freezing step (a2) the temperature of the slurry is lowered down to a temperature lower than 0° C., preferably lower than −100° C. This is preferably carried out by using liquid nitrogen.

It is preferred that the freezing temperature obtained in step (a2) is maintained during the grinding step (a3). This may be effectively done by continuously adding liquid nitrogen.

For carrying out the grinding step (a3), a suitable mill, preferably operating at a rotational speed of from 10,000 to 30,000 rpm, is generally used.

In order to be able to store and transport the material obtained in step (a3), said material is raised in temperature and subsequently dried whereby an additive is added to it before, during or after said grinding step and before drying, said additive being selected from the group consisting of a mono-, di- and poly-saccharide and mixtures thereof.

Said additive may be selected from galactomannan, glucomannan, sodium alginate, tamarind, seed gum, gellan-gum, sodium carboxymethyl cellulose, soybean water-soluble polysaccharide, karaya gum, gum Arabic, inulin, glucose, fructose, sucrose and mixtures thereof. Said additive is preferably selected from the group consisting of a low molecular weight inulin (having a degree of polymerization <10), fructose, glucose, sucrose and mixtures thereof. More preferably, said additive is low molecular weight inulin (having a degree of polymerization <10) Said additive was observed to be advantageous since it enables the user to properly rehydrate the dried material when said material is needed for preparing an edible emulsion according to the invention. In that case, the dried material is rehydrated before adding the other ingredients of the edible emulsion and homogenizing the resulting mixture.

Regarding the insoluble fibres present in the edible emulsion of the invention, such fibres are preferably found in fruits, both citrus and non-citrus, and legumes (such as vegetables). Preferred insoluble fibres suitable for use in this invention can be recovered from tomatoes, peaches, pears, apples, plums, lemons, limes, oranges, grapefruits or mixtures thereof.

Most preferred insoluble fibres are citrus fibres.

Typically, the edible emulsion of the invention comprises from about 0.1 to about 9.0% by weight, preferably, from 0.5 to 3% by weight of insoluble fibres, based on the total weight of the edible emulsion. Such insoluble fibres are commercially available from suppliers like J. Rettenmaier and Sohne GMBH under the Vitacel name and Herbstreith and Fox under the Herbacel name.

The only limitation with respect to the type of oil used in the edible emulsion of the present invention is that the oil is suitable for human consumption. Illustrative examples of the types of oil which may be used in this invention include, without limitation those which are liquid at ambient temperature like avocado, mustard, coconut, cottonseed, fish, flaxseed, grape, olive, palm, peanut, rapeseed, safflower, sesame, soybean, sunflower, mixtures thereof and the like.

Other types of oil which may be used in this invention are solid at ambient temperature. Illustrative examples of the oils which are solid at room temperature and suitable for use in this invention include, without limitation, butter fat, chocolate fat, chicken fat, hydrogenated palm kernel oil, mixtures thereof and the like.

In a preferred embodiment, the oil used in this invention is a liquid at ambient temperature. In a most preferred embodiment, the oil used in this invention is soybean, sunflower or rapeseed oil or a mixture thereof.

The amount of oil used in the edible emulsion of this invention is typically more than about 7.5 weight percent and less than about 85 weight percent, based on the total weight of the edible emulsion. Preferably, the amount of oil employed in the edible emulsion is from about 15.0% to about 80.0%, and most preferably, from about 20.0 to about 60% by weight, based on the total weight of the edible emulsion and including all ranges subsumed therein.

The water used in this invention can be pure water, tap water, bottled water, deionised water, spring water, or a mixture thereof. Thus the water used in this invention may be an aqueous solution comprising salts or minerals or both. Typically, the water makes up the balance of the edible emulsion and the food product made with the same.

The edible emulsion of the invention may be suitably combined with a dairy base. A suitable dairy base may be skim, part skim or full fat dairy base. Typical examples of the types of dairy base suitable for use in this invention include yogurt, crème fraiche, sour cream, mixtures thereof and the like. When used, the final product will preferably comprise about 5.0% to about 75% by weight dairy base, more preferably from about 8% to about 60% by weight dairy base.

The edible emulsion of the invention may also contain an emulsifier. A suitable emulsifier has an HLB of greater than about 8.0, and preferably, greater than about 11.0, and most preferably, from about 12.0 to about 18.0, including all ranges subsumed therein. Illustrative examples of such an emulsifier include, without limitation, PEG 20 tristearate, PEG trioleate, PEG 20 monostearate, PEG 20 monooleate, PEG 20 monopalmitate and PEG 20 monolaurate sorbitan, derivatives thereof, mixtures thereof and the like, also made available by ICI Surfactants under the names Tween and Span.

The preferred emulsifier employable in this invention is, however, a protein, like fruit, vegetable (e.g. pea protein), milk (e.g. whey), soy protein, or mixtures thereof.

Another preferred protein suitable for use in this invention is phospholipoprotein (e.g. phospholipoprotein present in egg yolk, whole egg or enzyme modified egg), and especially, egg yolk derived phospholipoprotein modified with phospholipase A as disclosed in U.S. Pat. No. 5,028,447, the disclosure of which is incorporated herein by reference. Furthermore, egg granule and plasma fractions and combinations thereof as disclosed in e.g. WO-A-2008/080738 can suitably be used as an emulsifier.

The total amount of emulsifier employed in the edible emulsion of this invention may be from about 0.5 to about 12.0%, and preferably, from about 0.5 to about 8.0% by weight of emulsifier, based on the total weight of the edible emulsion.

The edible emulsion of the invention may also contain a thickener. Preferred thickeners suitable for use in this invention include conventional food grade starches, pectin and gums, and preferably, a mixture of the same. When present, the starches are typically added to water to make a paste comprising about 1.0 to about 15% by weight starch, based on the total weight of starch and water. At least about 50%, and preferably about 100% of the paste may be added and mixed into the edible emulsion, after said emulsion has been homogenized. The gum may be added anytime before or after the emulsion is made and thoroughly mixed within the same.

It should be noted that the edible emulsion comprising insoluble fibres disclosed herein preferably has an oil-in-water phase.

It is particularly noted herein that if heat treatment, like pasteurization, is not desired, the edible emulsion described herein may be acidified in order to inhibit microbiological growth. When acidified, the food product comprising the edible emulsion of the invention typically has enough acidulant added so that the pH of the same is from about 2.75 to about 5.5, and preferably, from about 2.85 to about 5.5, and most preferably, from about 3.0 to about 4.0. In a preferred embodiment, at least about 50% by weight of the acid employed is added after homogenisation and in a most preferred embodiment, about 100% of the acid employed is added after homogenisation.

There is no limitation with respect to the type of acidulant that may be employed in this invention other than that the acidulant is one which may be used in formulations suitable for human consumption. Illustrative examples of the types of acidulants which may be used in this invention include, without limitation, acetic acid, citric acid, hydrochloric acid, lactic acid, malic acid, phosphoric acid, glucone-delta-lactone, mixtures thereof and the like. Preferably, the acidulant employed in this invention is acetic acid, lactic acid, malic acid or mixtures thereof.

It is noted that in lieu of oil or in combination with oil, conventional fat substitutes may be used. Preferred fat substitutes employable in this invention include fatty acid-esterified alkoxylated glycerine compositions as well as sucrose fatty acid esters. When employed, such conventional fat substitutes preferably make up at least about 30%, and most preferably, at least about 75% of the total weight of the oil in the emulsion.

The edible emulsions of this invention may be combined with optional additives to make a food product ready for consumption. Preferred optional additives which may be employed in the food products made with edible emulsion of the present invention include mustard flour, chocolate, nut paste, salt (and other spices and seasonings), vitamins, artificial flavors and colors (e.g., beta carotene) fruit puree, preservatives, antioxidants, chelators, meat like ham and bacon bits or particulates, buffering agents, vegetable bits or particulates, fruit bits or particulates, cheese, mixtures thereof and the like. Such optional additives, when used, collectively, do not make up more than about 40.0% by weight of the total weight of the food product.

When preparing the food product ready for consumption, the optional additives may be added to water and/or oil before the edible emulsion comprising insoluble fibre is made, but preferably the optional additives are mixed in after the emulsion is made (especially when the optional additives are large, like fruit or bacon bits). In a preferred embodiment, the resulting food product made with the edible emulsion comprising insoluble fibre of the present invention comprises less than about 75.0%, and more preferably, less than about 55.0%, and most preferably, from about 6.0 to about 35.0% by weight oil, based on total weight of the food product and including all ranges subsumed therein.

The preferred preservatives suitable for use in this invention include sodium benzoate, potassium benzoate, potassium sorbate, sorbic acid, benzoic acid, mixtures thereof and the like. Anti-oxidants suitable for use in this invention include a tocopherol, ascorbic acid, ascorbyl palmitate, tertiary-butyl hydroquinone, mixtures thereof and the like. Chelators suitable for use in this invention include EDTA and its salts, citric acid, sodium tripolyphosphate, sodium carbonate, potassium carbonate, mixtures thereof and the like.

The fruit and vegetable bits that may be used in food products comprising the edible emulsion of this invention are typically small enough to fit through the orifice present in a conventional squeeze bottle. The vegetable bits often include peppers, carrots, cabbage, onion, broccoli, mixtures thereof and the like. The fruit bits often include pears, apples, grapes, tomatoes, mixtures thereof and the like.

The cheese suitable for use in this invention can be skim, part skim or full fat cheese. Typical non-limiting examples of the types of cheese (including processed cheese) suitable for use in this invention include gouda, edam, leyden, cheddar, goat, chesire, stilton, mozzarella, cream cheese, brie, feta, tilsit, mixtures thereof and the like. When cheese is employed to make the food product, it is preferred that the same be melted prior to being added to the edible emulsion or any of its precursor phases. Often, the final food product will comprise from about 10.0% to about 35.0% by weight cheese.

Still other additives which may be optionally added to the food products of this invention include protein sources and sweeteners. The former include caseinate and skimmed milk powder and the latter include syrups, sucrose, glucose, saccharin, aspartame, dextrose, lactose, levelose, maltose, fructose, mixtures thereof and the like.

The viscosity of the food products made with the edible emulsion comprising insoluble fiber as disclosed herein is typically greater than about 3,000 and less than about 150,000 centipoise. When a sauce or pourable dressing is, for example, the desired food product, the viscosity of the food product is preferably from about 4,000 to about 10,000 centipoise, and most preferably, from about 4,350 to about 6,000 centipoise.

When a food product is desired with a relatively thin consistency, the viscosity of the food product is preferably from about 500 to about 10,000 centipoise, more preferably 1,000 to about 3,000 centipoise.

When the desired food product is, for example, a filling, dip or spoonable dressing, the viscosity of the food product is preferably from about 12,000 to about 120,000 centipoise, and most preferably, from about 16,000 to about 80,000 centipoise, whereby the viscosity of the food product is measured on a Haake Rheometer (Rotovisco RV20) at room temperature using a set of concentric cylinders (or bob-in-cup) with a 1 mm gap, the bob having a diameter of 1.0 cm and length of 1.0 cm. The inner cylinder or bob starts rotating from 0 shear and ramps up to a shear rate of 134 $sec^{-1}$ in 542 sec. By way of comparison, the viscosity values refer to the shear rate of 10 $sec^{-1}$.

Preferred types of food product including an edible emulsion of the invention are a dressing soup, sauce dip spread or drink.

The packaging for the food products comprising the edible emulsion of this invention is often a glass jar, food grade sachet or squeezable plastic bottle. Sachets are preferred for food service applications, and a plastic bottle is preferred for domestic use.

The following non-limiting examples are provided to facilitate an understanding of the present invention.

EXAMPLE 1

Various low-fat edible emulsion samples (being mayonnaise prototypes) were prepared having the following composition:

TABLE 1

| Ingredient | Percent by weight |
|---|---|
| Oil | 20.0 |
| Citrus fibre | 2.5 |
| EMEY (10%) | 4.0 |
| Vinegar (12%) | 2.4 |
| Salt | 1.5 |
| Sugar | 3.0 |
| EDTA | 0.01 |
| K-sorbate | 0.1 |
| Water | 66.49 |

Wherein:
Citrus fibre is Herbacel Citrus fiber ex Herbstreith & Fox;
EMEY (10%) is enzyme-modified egg yolk with 10% salt (NaCl).

All samples have the above composition but they were prepared in a different way.

The control sample A was prepared as follows.

A mixture having the above formulation was prepared by mixing the citrus fibre with an appropriate amount of tap water, adding the other ingredients and, treating the mixture in a mixing tank equipped with a Silverson high-shear mixer operated at 5000 rpm and during 5 minutes.

The thus obtained mixture was homogenised using a high pressure homogeniser (Niro Soavi, model Gaulin) operated at 350 bar and ambient temperature.

Furthermore, two samples 1 and 2 according to the present invention were prepared as follows.

Citrus fibre-in-water slurries containing 4% respectively 6% citrus fibres were prepared using the mixing tank equipment mentioned above. Subsequently, the slurries were frozen using liquid nitrogen, by pouring said slurries in a liquid nitrogen bath drop by drop.

Thus-formed frozen slurry droplets were fed into a fine impact mill (model 100UPZ from Hosokawa Alpine Ag & Co) operating at 16000 rpm and equipped with a plate beater milling device. Thereafter, a sieve of 1 mm was used to get favorable ground slurry. Liquid nitrogen was continuously added to the fine impact mill during operation thereof so as to avoid any thawing of the frozen slurry material during the grinding operation. The ground slurry material was raised in temperature to 5° C. and thereafter mixed with the other ingredients so as to obtain the above-indicated composition (as shown in Table 1) and said composition was homogenised using a high pressure homogeniser (Niro Soavi; model Gaulin) operated at 350 bar and ambient temperature.

As a consequence, all samples A, 1 and 2 have the same ingredient composition (being the composition shown in Table 1) and the same citrus fiber content (being 2.5 wt %).

Subsequently, all edible emulsion samples A, 1 and 2 were characterised regarding their Stevens value, viscosity, syneresis and the particle size of the citrus fiber material contained therein.

The viscosity of the samples was measured using a controlled stress Rheometer (TA-AR 1000) fitted with a 4 cm steel plate, whereas the Stevens value was measured using a Stevens-LFRA texture analyser with grid penetration speed of 1 mm/s whereby relative values are compared at 2 cm penetration depth.

The particle size of the citrus fibre material was measured using a laser diffraction based instrument (Mastersizer 2000), resulting in Sauter mean diameter values ($d_{32}$).

The extent of syneresis was estimated by weighing the water released from the gel structure over a period of 15 days.

The following relative values were found, whereby the values of sample A are taken as 0%:

| | Sample | | |
|---|---|---|---|
| | A (%) | 1 (%) | 2 (%) |
| Viscosity | 0 | +22 | +32 |
| Stevens Value | 0 | +16 | +26 |
| Particle Size | 0 | −20 | −17 |
| Syneresis | 0 | −29 | −40 |

When considering the above results, it can be concluded that the samples according to the invention showed considerably increased viscosity as compared to control sample A. In other words, the process according to the present invention resulted in thicker and stronger products. This means that said process has resulted in improved utilization of the citrus fibre technology.

Furthermore, the above table clearly shows increased Stevens values for the samples of the invention which means that their texture has improved.

It is also noted that the best viscosity and Stevens value results have been obtained with sample 2, which means that increasing the citrus fibre concentration in the slurry (from 4% to 6%) is beneficial for the texture and viscosity of the edible emulsion prepared with such slurry (using the method of the invention).

It is also noticeable in the above table that the particle size of the citrus fibre material present in the samples 1 and 2 according to the invention is clearly smaller than in comparative example A. In addition, it was observed that the syneresis of the samples of the invention was considerably lower than of the comparative sample A.

The invention claimed is:

1. Method for preparing fiber-in-water slurry containing insoluble fibers, wherein said method comprises the steps of:
   (a1)) Preparing fiber-in-water slurry containing
      4% to 10% by weight of insoluble fibers of a fruit selected from the group consisting of tomatoes, peaches, pears, apples, plums, citrus, and combinations thereof; and
      at least about 10 wt % water sufficient to hydrate said insoluble fiber;
   (a2) Freezing said slurry; and
   (a3) Grinding said frozen slurry in a rotating mill;
   wherein the freezing temperature obtained in step (a2) is maintained during the grinding step (a3); and
   wherein the grinding step (a3) is carded out in a rotating mill operating at a rotational speed of from 10,000-30,000 rpm.

2. Method according to claim 1, wherein in step (a2) the slurry is frozen to a temperature lower than 0° C.

3. Method according to claim 1, wherein the material obtained in grinding step (a3) is raised in temperature until it is in the liquid state and subsequently dried, whereby an additive is added to said material before, during or after said grinding step and before drying, said additive being selected from the group consisting of mono-, di-, poly-saccharides and mixtures thereof.

4. Method according to claim 3, wherein the additive is selected from the group consisting of low molecular weight inulin, said inulin having a degree of polymerization of <10, fructose, glucose, sucrose and mixtures thereof.

\* \* \* \* \*